United States Patent [19]

Ogawa et al.

[11] Patent Number: 5,295,803

[45] Date of Patent: Mar. 22, 1994

[54] DEVICE FOR CONTROLLING THICKNESS OF SHEET IN CALENDERING

[75] Inventors: Shigeyuki Ogawa; Masaru Suzuki, both of Kodaira, Japan

[73] Assignee: Bridgestone Corporation, Tokyo, Japan

[21] Appl. No.: 16,469

[22] Filed: Feb. 11, 1993

[30] Foreign Application Priority Data

Feb. 21, 1992 [JP] Japan .................................. 4-72571

[51] Int. Cl.$^5$ ...................... B29C 43/24; B29C 43/58
[52] U.S. Cl. .......................... 425/141; 100/93 RP; 264/40.5; 264/175; 425/367; 425/194
[58] Field of Search ................ 264/40.5, 40.7, 175; 425/141, 145, 363, 367, 194; 100/93 RP

[56] References Cited

U.S. PATENT DOCUMENTS

| | | | |
|---|---|---|---|
| 3,531,827 | 10/1970 | Dragonette | 425/367 |
| 3,635,627 | 1/1972 | Palmer | 425/141 |
| 3,817,068 | 6/1974 | Meyer . | |
| 3,871,808 | 3/1975 | Ancker | 425/367 |
| 3,936,258 | 2/1976 | Lake | 425/367 |
| 3,961,509 | 6/1976 | Dohrmann . | |
| 4,110,387 | 8/1978 | Wockener et al. | 264/40.5 |
| 4,117,054 | 9/1978 | Salo | 264/40.5 |
| 5,061,337 | 10/1991 | Fraser | 425/141 |

FOREIGN PATENT DOCUMENTS

| | | |
|---|---|---|
| 1931654 | 5/1971 | Fed. Rep. of Germany . |
| 4009544 | 6/1991 | Fed. Rep. of Germany . |
| 62-17527 | 1/1987 | Japan . |
| 62-151311 | 7/1987 | Japan . |

OTHER PUBLICATIONS

Patent Abstracts of Japan, vol. 011, No. 380 (M-650) Dec. 11, 1987.
Patent Abstracts of Japan, vol. 9, No. 311 (M-436)(2034) Dec. 7, 1985.

Primary Examiner—Jeffery Thurlow
Assistant Examiner—Mathieu Vargot
Attorney, Agent, or Firm—Sughrue, Mion, Zinn, Macpeak & Seas

[57] ABSTRACT

A device for controlling the thickness of a sheet in calendering includes a thickness measuring unit for measuring the thickness of the sheet immediately after it has been formed by a pair of calender rolls, and a roll adjusting unit for moving at least one of the pair of calender rolls toward and away from the other calender roll. The device further includes a detection unit for detecting change in distance between the axes of the pair of calender rolls, and a control device for comparing the measured thickness of the sheet with a target thickness to obtain a difference therebetween. The control device then calculates a gap adjusting value on the basis of the difference, and compares the change in distance between the axes of the rolls detected by the detection unit with the calculated gap adjusting value. When these values become equal, the control device stops the movement of the one calender roll to make the thickness of the sheet equal to the target thickness.

2 Claims, 4 Drawing Sheets

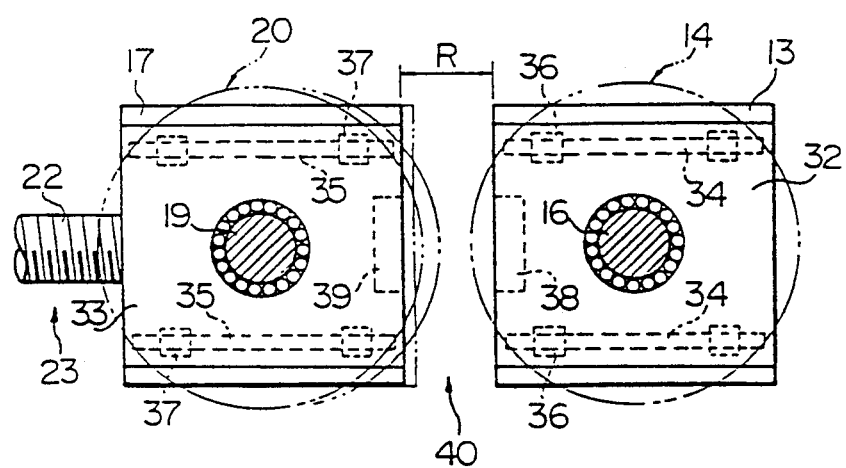
FIG._4

DEVICE FOR CONTROLLING THICKNESS OF SHEET IN CALENDERING

BACKGROUND OF THE INVENTION

This invention relates to a method and a device for controlling the thickness of a sheet to be a target thickness during forming it by calender rolls.

In general, when a sheet is being formed by calender rolls, the thickness of the sheet often changes owing to change in physical properties of materials of the sheet, forming temperatures and the like. In order to overcome this problem, it has been proposed that the thicknesses of a sheet is measured immediately after it has been formed to obtain a difference between the measured value and a target value. At least one of the calender rolls is then moved correspondingly to the obtained difference to adjust the gap between the calender rolls, thereby controlling the thickness of the sheet to be the target thickness.

The principle of such a control of the thickness will be explained with reference to FIG. 1 whose ordinate indicates rolling forces N of calender rolls and the abscissa shows gaps G between the calender rolls. Curves A and B in FIG. 1 indicate the rolling force characteristics of materials, which are called as "plastic curve of material in rolling". These curves progressively lower to the right in the graph, because the narrower the gap between the rolls, the higher is the rolling force. The plastic curve of material depends upon kinds of materials to be formed, working temperatures, calendering speeds, and amounts of bank materials (amounts of materials arranged between calender rolls) and moves toward the right in the graph with harder materials, lower working temperatures and more bank materials.

Straight lines a and b in the graph indicate the relationship between the rolling force N and the gap between calender rolls and rise to the right in the graph, because the calender rolls are more deformed and the frame of the calender supporting the calender rolls is more elongated as the rolling force N increases. In this case, the gradients K of the straight lines a and b are called as "mill modulas" which shows a rigidity of the calender as a whole.

It is no assumed that the calendering is performed along the curve A and the straight line a. The gap G between the calender rolls and the rolling force N are determined by the point of intersection T0 of these lines A and a, the former h0 and the latter P0. It is further assumed that the gap h0 gives a target thickness of a sheet and a material is supplied between the calender rolls with the gap h0. If the plastic characteristics of the material change to move from the curve A to the curve B, the point of intersection moves from T0 to T1 so that the gap G between the calender rolls increases by $\Delta h$ to be h1.

In order to restore the thickness of the sheet to the target thickness, the increased gap h1 must be returned to h0. For this end, the roll gap control device of the calender is adjusted by an adjustment $\Delta s$ to move the straight line a to the line b so that the calendering is performed along the curve B and the straight line b. Consequently, the gap G between the calender rolls becomes h0 given by the point of intersection T2 of the curve B and the straight line b. The thickness of the sheet is thus controlled to be the target thickness in this manner.

The following relationship is established between the $\Delta s$ and $\Delta h$.

$$\Delta s = (1 + M/K) \times \Delta h$$

Upon substituting $(1+M/K)$ in the equation by control coefficient $\alpha$, the equation reads as follows.

$$\Delta s = \alpha \times \Delta h$$

where M is gradient of plastic curve of material which is a gradient at the point of intersection T0, T1 or the like of the curve A or B, and K is the mill modulas described above. The above equation means that if it is required to adjust the gap G by $\Delta h$, the roll gap control device of the calender may be adjusted by $\alpha \times \Delta h$.

In the prior art, the control of the gap between calender rolls has been effected with an estimation that the gap between calender rolls will be changed some amount by adjusting the roll gap control device of a calender a certain amount in the manner described above. In such an operation, the control of the thickness of a sheet has been performed by using a constant control coefficient experimentally determined, notwithstanding that it will change when the plastic characteristics of a material to be calendered is changed. Consequently, the actually corrected amounts of the gap often deviate from the estimated amounts to an impermissible extent.

Moreover, the control coefficient includes some errors because it was experimentally determined. As a result, the actually corrected amounts of the gap tend to deviate somewhat from the estimated amounts. In order to overcome this problem, it has been proposed to correct the control coefficient $\alpha$ to an optimum value spontaneously in forming a sheet as disclosed in, for example, Japanese Patent Application Publication No. 62-17,527. However, this method suffers disadvantages from the very complicated control and the complicated and expensive apparatus.

SUMMARY OF THE INVENTION

It is an object of the invention to provide a method and an apparatus for controlling the thickness of a sheet in calendering by correctly adjusting gaps between calender rolls with easy controlling.

In order to accomplish this object, the method for controlling the thickness of a sheet in calendering according to the invention comprises steps of measuring the thickness of the sheet immediately after it has been formed by a pair of calender rolls, comparing the measured thickness of the sheet with its target value to obtain a difference therebetween, calculating a gap adjusting value for correcting the gap between the pair of calender rolls on the basis of the difference, and moving at least one of the calender rolls relative to the other, during which the change in distance between the pair of the calender rolls is detected and when the detected change becomes equal to the gap adjusting value, the one of the calender roll is stopped to make the thickness of the formed sheet equal to said target value.

On the other hand, the device for controlling the thickness of a sheet in calendering according to the invention comprises thickness measuring means for measuring the thickness of the sheet immediately after it has been formed by a pair of calender rolls, roll adjusting means for moving at least one of the pair of calender rolls toward and away from the other calender roll, detection means for detecting change in distance between the axes of said pair of calender rolls, and control means for comparing the measured thickness of the sheet with a target thickness to obtain a difference therebetween and thereafter calculating a gap adjusting value on the basis of the difference, comparing the change in distance between the axes of the rolls detected by the detection means with the calculated gap adjusting value, and when these values become equal, stopping the movement of the one calender roll, thereby controlling said roll adjusting means to make the thickness of the sheet equal to the target thickness.

It is now assumed that a sheet is being continuously formed by a pair of calender rolls. The thickness of the sheet is measured by the measuring means and the measured value is sent from it to the control means. The control means compares the measured value with a target value of the thickness to obtain the difference therebetween and calculates a gap adjustment value between the calender rolls on the basis of the difference. The roll adjusting means is actuated to move at least one of the calender rolls to move then toward or away from each other.

During the movement of the one calender roll, the change in distance between the roll shafts of the calender rolls is detected by means of the detection means and the detected change is sent to the control means. The control means compares the change with the gap adjustment value and stops the operation of the roll adjusting means so as to stop the movement of the one calender roll when the change and the gap adjustment value become equal to each other. In this manner, the control of the calender roll has been performed to correct the gap between the calender rolls so as to make the thickness of the sheet equal to the target value.

In this case, the change in the distance between the roll shafts is indirectly detected by means of the distance detection means for the purpose of detecting the change in gap between the calender rolls themselves. This is because it is impossible to detect the gap between the calender rolls directly. Further, this is also because the support members include therein spaces sufficient to receive the detection means. Moreover, this is also because the change in deflection of the roll shafts due to the change in rolling force during forming the sheet is much smaller than the other elastic changes (the change in strains occurring in the frame, the reduction screws of the roll adjusting means and the bearing units) so that the change in distance between the roll shafts is very approximate to the change in the gap between the calender rolls. Consequently, in substitution for the change in the gap between the calender rolls, the change in distance between the roll shafts can be used without lowering substantial accuracy for this purpose.

The change in distance between the roll shafts is detected by means of the detection means to control the thickness of the sheet in the manner described. Therefore, even if the plastic characteristics or the like of the sheet material are changed, the gap between the calender rolls can be exactly corrected by the estimated or expected gap adjustment value. Moreover, such an exact adjustment of the gap can be performed only by comparing the change input from the detection means with the gap adjustment value obtained in the control means, thereby simplifying the controlling of the thickness of the sheet formed by the calender rolls.

The invention will be more fully understood by referring to the following detailed specification and claims taken in connection with the appended drawings.

BRIEF DESCRIPTION OF THE DRAWINGS

FIG. 4 is a sectional view taken along the line IV—IV in FIG. 3.

DESCRIPTION OF THE PREFERRED EMBODIMENTS

Figure 2:
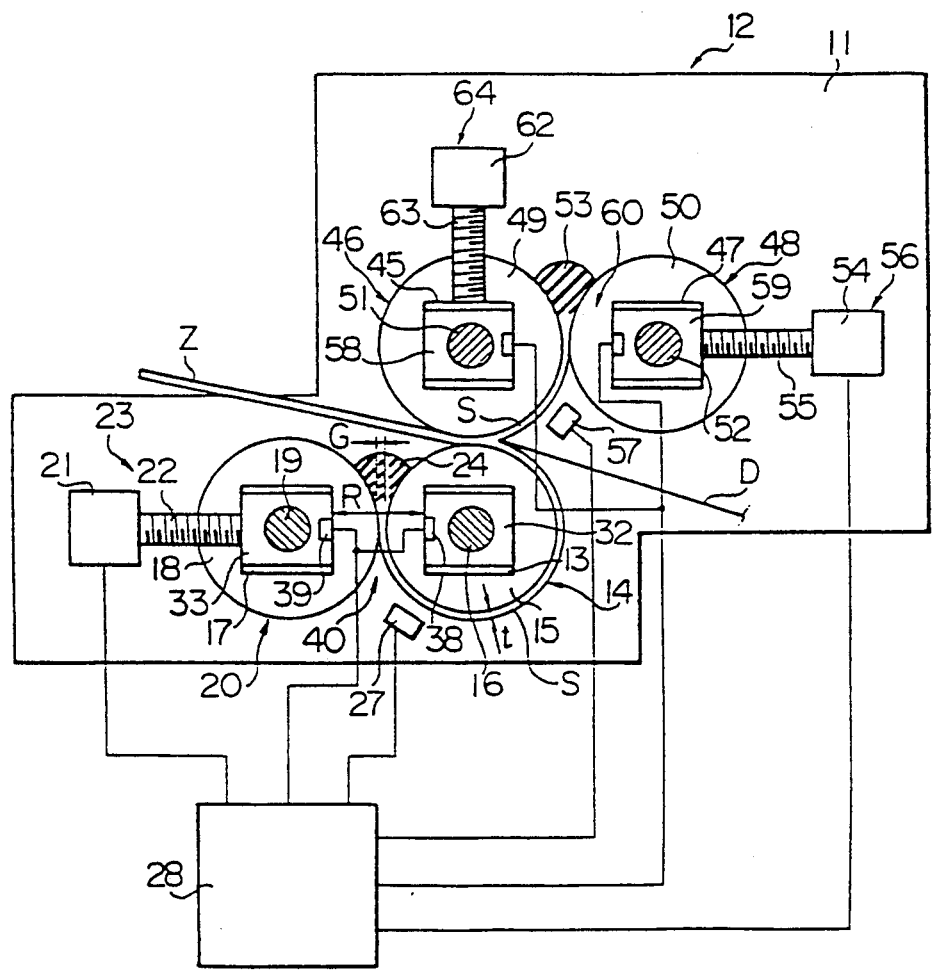
FIG. 2 is a front sectional view illustrating one embodiment of the device according to the invention applied to a calender including calender rolls.
Figure 3:
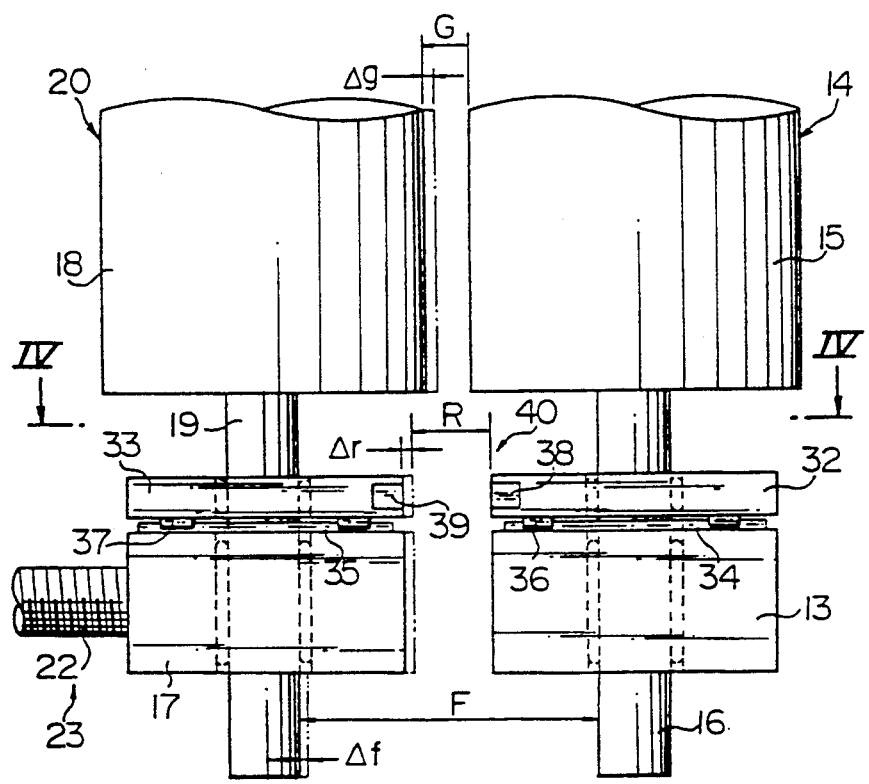
FIG. 3 is a plan view illustrating the proximity of the ends of the calender rolls shown in FIG. 2.

Referring to FIGS. 2, 3 and 4, a calender 12 includes a frame 11 having in its lower portion bearing units 13 fixed thereto. A horizontal calender roll 14 extends in the direction perpendicular to the plane of FIG. 2 and consists of a cylindrical main roll body 15 having a large diameter and roll shafts 16 extending axially outwardly from both the ends of the main body and having diameters smaller than that of the main body. The calender roll 14 is rotatably supported by the bearing units 13 into which the roll shafts 16 are inserted.

Further bearing units 17 are supported movably in the direction perpendicular to the axial direction of the calender roll 14 by the frame 11 forward of the bearing units 13. A calender roll 20 is rotatably supported in the bearing units 17, which is similar in construction to the calender roll 14, which consists of a cylindrical main roll body 18 having a large diameter and roll shafts 19 having small diameters. The calender roll 20 extends parallel to the calender roll 14 to form a pair of rolls. Threadedly engaged into the bearing units 17 are reduction screws 22 connected to output shafts of motors 21 mounted on the frame 11, respectively.

As a result, when the motors 21 are energized to rotate the reduction screws 22, the calender roll 20 is moved together with the bearing members 17 toward or away from the calender roll 14 in the direction perpendicular to its axis. The motors 21 and the reduction screws 22 form as a whole roll adjusting means 23 for moving at least one of the calender rolls, the roll 20 in this embodiment, toward or away from the other roll 14. The pair of calender rolls 14 and 20 are rotated in reverse directions in synchronism with each other by motors (not shown) so that a bank rubber 24 arranged between the calender rolls 14 and 20 is caused to pass between them to be formed into a continuous rubber sheet S.

Arranged below the calender roll 14 is a thickness sensor 27 as measuring means which measures the thickness t of the rubber sheet S immediately after it has been formed by the calender rolls 14 and 20 and sends the measured results into control means 28. The control means 28 compares the measured value with a target value previously set in the control means 28 to obtain a difference value therebetween, if any. Thereafter, the control means calculates a gap adjustment value $\Delta g$ between the calender rolls 14 and 20 on the basis of the difference value. The control means 28 then energizes the motors 21 so as to rotate the reduction screws 22 to move the calender roll 20 in the direction reducing the difference value.

Support members 32 are rotatably supported by the roll shafts 16 of the calender roll 14 between the main roll body 15 and the bearing units 13, respectively (FIG. 3). In the similar manner, support members 33 are rotatably supported by the roll shafts 19 of the calender roll 20 between the main roll body 18 and the bearing units 17, respectively. Moreover, a pair of guide rails 34 extending in the directions parallel to the movable directions of the calender roll 20 are mounted on the inner face of each of the bearing units 13 in opposition to the support member 32 (FIG. 4). Similarly, a pair of guide rails 35 extending in the directions parallel to the movable directions of the calender roll 20 are mounted on the inner face of each of the bearing units 17 in opposition to the support member 33. On the other hand, slide bearings 36 are mounted on the outer face of each of the support members 32 so as to slidably engage the guide rails 34. In the similar manner, slide bearings 37 are mounted on the outer face of each of the support members 33 so as to slidably engage the guide rails 35. With this arrangement, the support members 32 and 33 are regulated or prevented from being rotatably driven by the rotations of the calender rolls 14 and 20.

Detection members 38 and 39 are mounted on the nearest portions of the support members 32 and 33, respectively, and form as a whole distance detection means 40 which are, for example, non-contact type laser distance detector or contact type differential transformer distance detector for detecting change $\Delta r$ in distance R between the detection members 38 and 39. (The change $\Delta r$ is substantially equal to the change $\Delta f$ in distance F between the roll shafts 16 and 19.)

With the support members 32 and 33 connected to the bearing units 13 and 17 through the guide rails 34 and 35 and the slide bearings 36 and 37, respectively, in the manner described above, even if strains occur in the frame 11, the reduction screws 22 and the bearing units 13 and 17 due to change in rolling force of the calender rolls 14 and 20, these strains are not transmitted to the support members 32 and 33. As a result, the distance detection means 40 can correctly detect the change $\Delta r$ in the distance R between the detection members 38 and 39 or the change $\Delta f$ in the distance F between the roll shafts 16 and 19.

In this case, moreover, the change $\Delta f$ in the distance F between the roll shafts 16 and 19 is very approximate to the change in the gap G between the main roll bodies 16 and 18. It can be therefore considered that the change in the gap G between the main roll bodies 16 and 18 be equal to the change $\Delta r$ in the distance R between the detection members 38 and 39 or the change $\Delta f$ in the distance F between the roll shafts 16 and 19. The change $\Delta f$ detected by the distance detection means 40 is then sent to the control means 28 which compares the change $\Delta f$ with the gap adjustment value $\Delta g$ and send signals to the motors 21 to stop the operation of the roll adjustment means 23 or the movement of the calender roll 20.

Bearing units 45 are provided immediately above the calender roll 14 and supported upward and downward removably in the frame 11. A calender roll 46 is rotatably supported in the bearing units 45 so as to be parallel to the calender roll 14. Moreover, bearing units 47 are supported in the frame 11 immediately rearward of the calender roll 46 so as to be movable in the directions perpendicular to the axial direction of the calender roll 46. A calender roll 48 extends in parallel with the calender roll 46 to form a roll pair and is rotatably supported by the bearing units 47. Identical with the calender roll 14, these calender rolls 46 and 48 consist of large diameter main roll bodies 49 and 50 and small diameter roll shafts 51 and 52, respectively. When these calender rolls 46 and 48 are rotated by motors (not shown), a bank rubber 53 arranged between these rollers 46 and 48 is formed into a continuous rubber sheet S.

At least one (the calender roll 48 in the shown embodiment) of the calender rolls 46 and 48 is moved by roll adjusting means 56 consisting of motors 54 and reduction screws 55 similar in construction to the roll adjusting means 23 so that the calender roll 48 is moved toward and away from the calender roll 46. A thickness sensor 57 as measuring means is arranged below the calender roll 46, which measures the thickness of the rubber sheet S immediately after it has been formed to send measured results into the control means 28. Moreover, support members 58 and 59 and distance detection means 60 are provided on the roll shafts 51 and 52 of the calender rolls 46 and 48, which are similar in construction to the support members 32 and 33 and the distance detection means 40. When a change in the distance between the roll shafts 51 and 52 is detected by the distance detection means 60, the detected value is sent into the control means 28. Such an input is processed by the control means in the same manner described above.

The calender roll 46 is moved upward and downward by moving means 64 which consists of motors 62 and reduction screws 63 similar in construction to the roll adjusting means 23 so as to adjust the gap between the calender rolls 14 and 46. A cord fabric D of a number of cords is supplied between the calender rolls 14 and 46 together with the sheet S formed by the calender rolls 14 and 20 and the sheet S formed by the calender rolls 46 and 48 to form a belt-shaped member Z consisting of the cord fabric D and the sheets S pressure-joined with both the surfaces of the cord fabric D.

The operation of the device according to the invention will be explained hereinafter.

Figure 1:
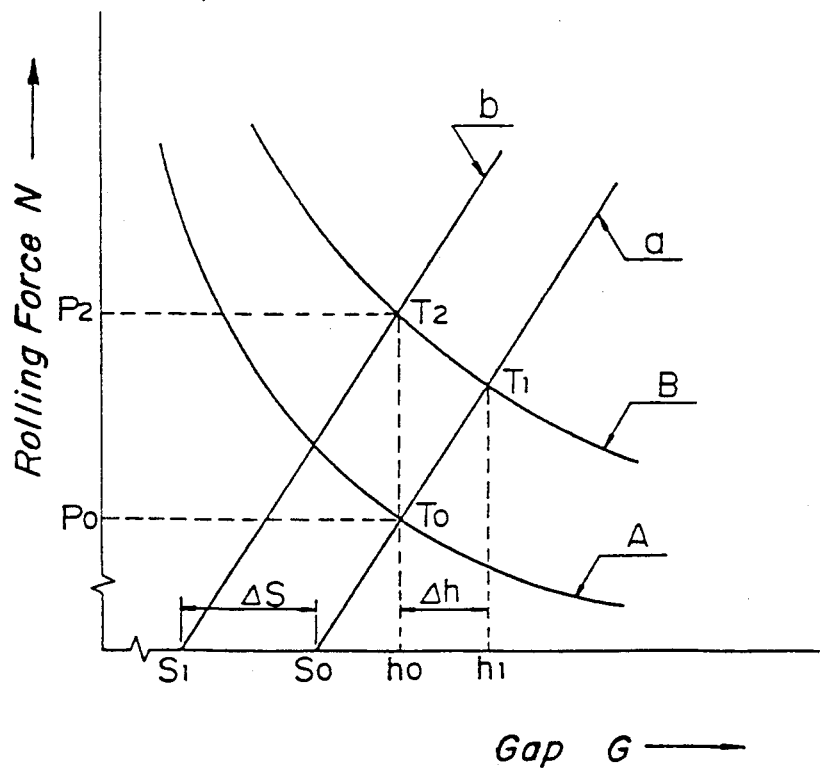
FIG. 1 is a graph for explaining the principle of controlling thicknesses of sheets formed by calendar rolls in the prior art.

First, the operation of the calender rolls 14 and 20 will be concentrically explained in order to simplify the explanation. It is now assumed that a bank rubber 24 arranged between the pair of calender rolls 14 and 20 is passing therebetween to form a sheet S continuously. At this moment, the formed sheet S is in close contact with and fed on the outer circumference of the calender roll 14 and is then transferred between the calender rolls 14 and 46. During such a transferring, the thickness t of the sheet S immediately after being formed is measured by the thickness sensor 27. The measured value is then sent from the thickness sensor 27 to the control means 28. The control means 28 compares the measured value with a target value of the thickness of the sheet to obtain its difference therebetween, if any. The control means 28 then calculates a gap change value $\Delta h$ as shown in FIG. 1 (which is also a gap adjustment value $\Delta g$).

Thereafter, the control means 28 sends operative signals into the motors 21 of the roll adjusting means 23 to rotate the reduction screws 22 so that the calender roll 20 is moved relative to the calender roll 14 to reduce the difference between the measured value and the target value of the thickness of the sheet. During such a movement of the calender roll 20, the distance detection means 40 detects the changes $\Delta f$ in distance F between the roll shafts 16 and 19 of the calender rolls 14 and 20 and sends the changes $\Delta f$ in succession into the control means 28 every moment. The control means 28 continuously compares the changes $\Delta f$ with the gap change value Δh (Δg). When these values become equal, the control means 28 sends signals to the motors 21 of the roll adjusting means 23 so as to stop the motors 21 and hence the movement of the calender roll 20. Therefore, the gap between the calender rolls 14 and 20 is corrected so that the thickness of the sheet S becomes the target value.

As described above, the change in the gap G between the calender rolls 14 and 20 is indirectly detected by detecting the change Δf in the distance F between the roll shafts 16 and 19 by means of the distance detection means 40. This is because it is impossible to detect the ga G between the calender rolls 14 and 20 directly. Further, this is also because the support members 32 and 33 include therein spaces sufficient to receive the detection members 38 and 39 constituting the distance detection means 40. Moreover, this is also because the change in deflection of the roll shafts 16 and 19 due to the change in rolling force is much smaller than the change in strains occurring in the frame 11, the reduction screws 22 of the roll adjusting means 23 and the bearing units 13 and 17 due to the change in rolling force so that the change Δf in distance F between the roll shafts 16 and 19 is very approximate to the change in the gap between the calender rolls 14 and 20, in more detail the change in the gap between the main roll bodies 15 and 18. Consequently, in substitution for the change in the gap G between the rolls 14 and 20, the change Δf in distance F between the roll shafts 16 and 19 can be used without lowering substantial accuracy for this purpose.

The change Δf in distance F between the roll shafts 16 and 19 is detected by means of the distance detection means 40 to control the thickness of the sheet in the manner described above without using the control principle of the prior art aforementioned. Therefore, even if the plastic characteristics or the like of the bank rubber 24 are changed, the gap G between the calender rolls 14 and 20 can be exactly corrected by the expected gap adjustment value Δg (gap change value Δh) without being affected by such changes of the bank rubber. Moreover, such an exact adjustment of the gap can be performed only by comparing the change Δf input from the distance detection means 40 with the gap adjustment value Δg (Δh) and the control of the gap becomes simple. By effecting such a control, the gap G between the calender rolls 14 and 20 can be adjusted with high accuracy in a short time.

Furthermore, if the thickness of a sheet S formed by the calender rolls 46 and 48 deviates from a predetermined thickness, the thickness is controlled by the operation of the control means 28 on the basis of outputs from the thickness sensor 57 and the distance detection means 60 in the same manner as described above. The sheets S whose respective thicknesses have been thus controlled are introduced between the calender rolls 14 and 46 to form a sheet-shaped member Z consisting of cord fabric D and the sheets S pressure-joined with both its surfaces.

As can be seen from the above explanation, according to the invention the gap between calender rolls can be exactly modified or corrected with the easy controlling of the rolls.

While the invention has been particularly shown and described with reference to preferred embodiments thereof, it will be understood by those skilled in the art that the foregoing and other changes in form and details can be made therein without departing from the scope of the claims.

What is claimed is:

1. A device for controlling the thickness of a sheet in calendering, comprising thickness measuring means for measuring the thickness of the sheet immediately after it has been formed by a pair of calendar rolls, roll adjusting means for moving at least one of the pair of calender rolls toward and away from the other calender roll, detection means for detecting a change in distance between the axes of said pair of calender rolls, and control means for comparing the measured thickness of the sheet with a target thickness to obtain a difference therebetween and thereafter calculating a gap adjusting value on the basis of the difference, comparing the change in distance between the axes of the rolls detected by the detection means with the calculated gap adjusting value, and when these values become equal, stopping the movement of the one calender roll toward or away from the other, thereby controlling said roll adjusting means to make the thickness of the sheet equal to the target thickness, wherein a roll shaft extending axially outwardly from each end of a roll body of each calender roll is supported by a bearing unit and provided with a support member rotatably supported thereby between the roll body and the bearing unit, and a pair of guide rails are provided on the surface of one of the bearing unit and the support member facing each other, and slide members slidably movable on each of the guide rails are provided on the other, thereby preventing the support member from rotating together with the calender roll.

2. The device as set forth in claim 1, wherein said detection means are provided on the nearest portions of the support members in opposition to each other.

* * * * *